United States Patent
Weiss et al.

(10) Patent No.: US 6,765,147 B1
(45) Date of Patent: Jul. 20, 2004

(54) TWIST OUT SEALED CONDUIT KNOCKOUT

(75) Inventors: Bruce W. Weiss, Milwaukee, WI (US); Keith A. Alwardt, Hartford, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/649,842

(22) Filed: Aug. 26, 2003

(51) Int. Cl.[7] .............................................. H01R 13/46
(52) U.S. Cl. ..................... 174/60; 174/65 R; 174/64; 174/49; 220/3.8; 429/535
(58) Field of Search .............................. 174/65 R, 135, 174/64, 60, 49, 68.1, 100; 220/3.2, 3.8; 439/535, 394

(56) References Cited

U.S. PATENT DOCUMENTS

| | | | | |
|---|---|---|---|---|
| 4,688,146 A | * | 8/1987 | Newmark et al. | 361/672 |
| 5,728,973 A | * | 3/1998 | Jorgensen | 174/65 R |

OTHER PUBLICATIONS

Hoffman Enclosures Inc.; QLINE® I Polycarbonate and ABS Type 4X Enclosures; Bulletin Q41; Dated Jun. 2003, pp. 6.160–6.163.

* cited by examiner

*Primary Examiner*—Dhiru R Patel
(74) *Attorney, Agent, or Firm*—Quarles & Brady; William R. Walbrun

(57) ABSTRACT

A pre-defined conduit knockout is formed as a unitary part of an electronics enclosure so that before its removal the knockout is joined to the housing at a continuous unbroken surface, thereby preventing debris and liquid from entering the housing from around the knockout. The knockout is bounded by a reduced thickness break-away section of an enclosure wall that shears apart to separate the knockout from the enclosure. The knockout is formed with a unitary, pocketed tool receptor adapted to receive a tool, such as a screwdriver or pliers, for twisting the knockout free of the housing without the need to apply an impact force, which could upset sensitive electronics in the enclosure. Methods of forming the knockout in, and removing it from, an electronics housing are also disclosed.

20 Claims, 3 Drawing Sheets

FIG. 1
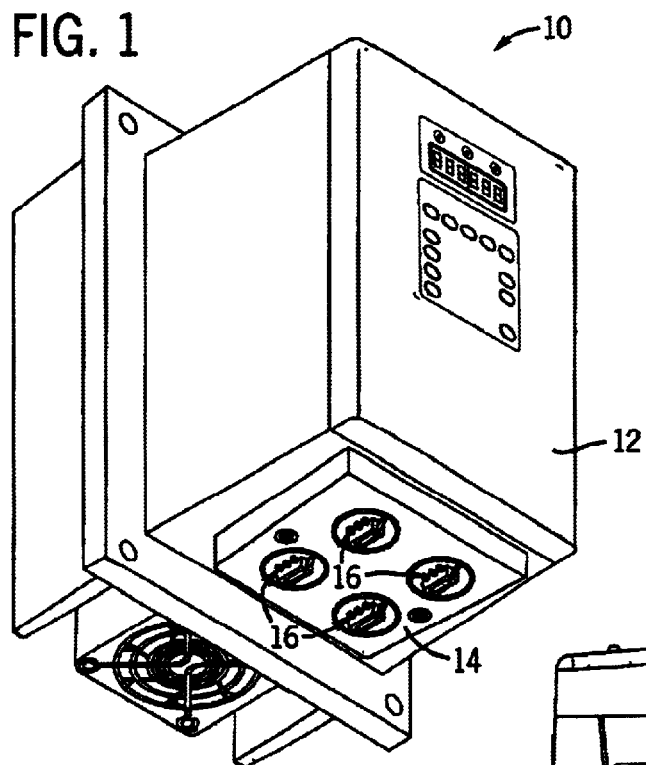
FIG. 2
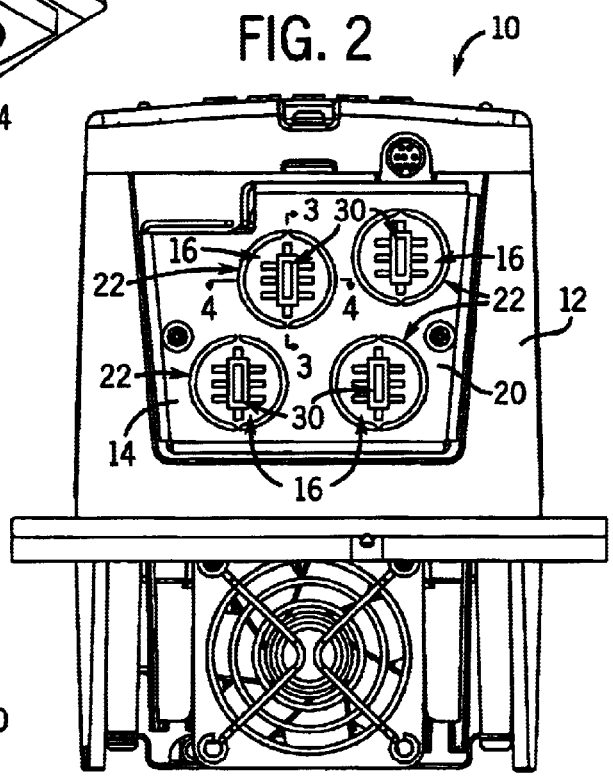
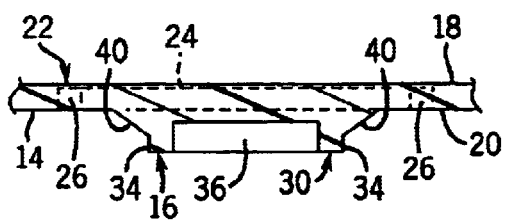
FIG. 3
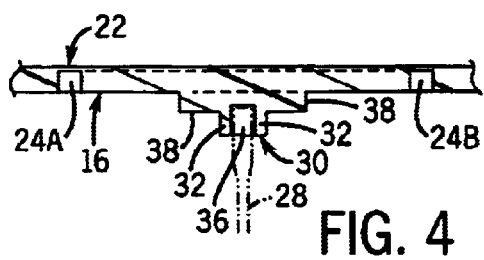
FIG. 4

TWIST OUT SEALED CONDUIT KNOCKOUT

CROSS-REFERENCE TO RELATED APPLICATIONS

Not applicable.

STATEMENT OF FEDERALLY SPONSORED RESEARCH OR DEVELOPMENT

Not applicable.

BACKGROUND OF THE INVENTION

The present invention relates to electronics enclosures and in particular to pre-defined "knockouts" providing openings in the enclosures for running electrical leads from the enclosures through electrical conduit.

Metal or plastic electrical junction boxes and electronics enclosures or cabinets, such as for circuit breaker panels, machine controls and motor drives, are typically mounted remotely (for example on a nearby wall) from the associated electrical components. Power lines must be run into the enclosure and electrical leads must be run from the enclosure to the associate component. Tubular conduit is used (typically required) to encase the wire running to and from the enclosure. Consequently, the enclosures often have pre-defined punched or weakened areas in one or more walls outlining a section of the wall to be removed to provide an opening for the conduit. The opening is created by knocking on or striking the wall of the enclosure within the weakened outline, usually with a hammer, to release this "knockout" section from the enclosure. Because the conduit is typically tubular with a circular cross-section, the knockout and opening are usually circular. The conduit attaches to a knockout fitting, sometimes having a resilient seal, which fits into the opening and has a threaded end on which threads a nut that holds the fitting (and the conduit) to the enclosure.

To ease removal, the knockout is typically partially punched from the enclosure wall with the wall being cut all the way through along most of the circumference except for one or two small sections that remain intact. When the knockout is to be removed, it is impacted with a hammer to break away the originally intact sections.

Some enclosures are designed to be sealed according to the standards prescribed by the National Electrical Manufacturers Association (NEMA®). For example, a NEMA 4 rated enclosure is sealed sufficiently to allow it to be sprayed down with a liquid and a NEMA 12 rated enclosure is sealed against dust, dirt and dripping of non-corrosive liquids. To meet these standards, there cannot by openings in the enclosure walls as there would be if the enclosure had partially punched out knockouts, as described in the preceding paragraph. Therefore, some NEMA 4 and NEMA 12 enclosures are made without any pre-defined knockouts. To install electrical conduit to such enclosures, the installer in the field is required to use a punch or hole saw to create the conduit opening.

To lessen the burden on the installer, some enclosures are made with the full openings (without knockouts) which are plugged or capped before the conduit is installed. This technique requires additional component and assembly cost by virtue of the plugs.

Some enclosures are made with pre-defined knockouts the outlines of which are defined by a narrowed thickness of the wall. This way, the wall remains intact so that no leakage into the enclosure can occur, while weakening the walls somewhat so that the knockout can be forced out under impact. This technique can be problematic for certain applications in which the enclosure contains electronics sensitive to shock or where the electronics must be located near the knockout location in which case it could be struck directly (and damaged) when impacting the knockout.

SUMMARY OF THE INVENTION

In one aspect the present invention provides a conduit knockout made from a wall section, having a first face and an opposite second face, defining a break-away section having a first side coplanar with the first face and an opposite second side at least a portion of which is between the first and second faces so as to create a groove in the wall section opening to the second face side of the wall section defining at least a portion of a periphery of the knockout. The wall section defines an essentially continuous, unbroken surface across the break-away section and the break-away section allows separation of the knockout from the wall section with rotation of the knockout.

Preferably the wall section is part of a plastic electronics housing and the first face of the wall section is at an interior of the housing.

In one preferred form, the knockout is circular and the break-away section includes one or more (preferably two spaced apart 180 degrees) tab portions having opposite sides at the first and second faces of the wall section.

In another preferred form, the knockout includes a tool receptor adapted to receive a tool for applying torque to break the break-away section and remove the knockout from the wall section. The tool receptor is formed as a unitary part of the wall section and has four walls defining a rectangular pocket extending to a third face on the side of the second face opposite the first face. Preferably, the tool receptor is braced at one or more sides, including gussets extending from the two short walls to opposite parts of the periphery of the knockout section, preferably near the thicker, tab portions of the break-away section.

In another aspect the invention provides a method of forming a conduit knockout in an electronics enclosure. The method includes forming a wall of the electronics housing having an inner face and an outer face and molding into that wall a break-away section at least a portion of which extends from one of the inner and outer faces to an intermediate depth between the inner and outer faces without passing all the way between the inner and outer faces so as to define at least part of a periphery of a conduit knockout. Preferably, a tool receptor is also molding into the conduit knockout to receive a tool for applying torque to break the break-away section and remove the knockout from the wall.

In yet another aspect the invention provides a method of removing a conduit knockout from a wall of an electronics housing. This method includes attaching a tool to a tool receptor portion of the knockout and rotating the knockout (using the tool in the receptor) with respect to the housing generally in the same plane as the wall in which it is formed so as to separate the knockout from the wall at a break-away section at least a part of which has a narrowed thickness than the wall originally forming a continuous unbroken surface between the wall and the knockout at one side of the housing.

Thus, the present invention provides an improved apparatus and method for providing a conduit knockout in an electronics enclosure. The knockout is molded into the enclosure housing, which can be done at the same time the housing is molded, thus eliminating the need for secondary punching steps. While the knockout is pre-defined in the housing, it need not be partially cut out because the wall of the housing is thinned at some or all of the periphery of the knockout. Thus, an inner (or outer) surface of the housing can remain intact so that debris and liquid cannot enter therein. Electronic enclosures can be formed with the pre-defined knockouts according to the present invention and still meet NEMA 4 and 12 standards. Additionally, the integral tool receptor receives a standard flat blade screwdriver, pliers, wrench or other readily available tool for removing the knockout. The knockout can be removed by a simple twisting motion, with the need to impact the housing, which could damage sensitive electronics inside the enclosure. Moreover, the knockouts can be formed to any one of the standard conduit sizes and be used with conventional knockout fittings to provide a tight, splash proof connection of the conduit to the enclosure.

These and other advantages of the invention will be apparent from the detailed description and drawings.

BRIEF DESCRIPTION OF THE DRAWINGS

FIG. 1 is a perspective view of a motor control having a splash proof housing formed with unitary knockouts according to the present invention;

FIG. 2 is a bottom view thereof;

FIG. 3 is a partial cross-sectional view taken along line 3—3 of FIG. 2 of one of the knockouts;

FIG. 4 is a partial cross-sectional view taken along line 4—4 of FIG. 2 with the tip of a screwdriver shown in phantom inserted into a tool receptor of the knockout;

DETAILED DESCRIPTION OF THE PREFERRED EMBODIMENT

Figure 5:
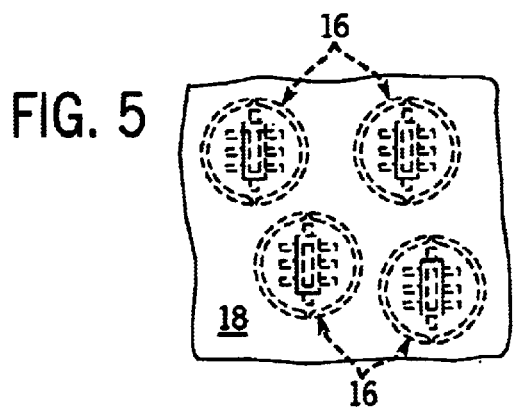
FIG. 5 is a partial plan view from the inside of the housing showing the continuous, unbroken inside surface of the housing before the knockouts are removed and showing the exterior features of the knockouts in phantom.

FIGS. 1 and 2 illustrate a motor control 10 having control circuitry disposed in an enclosure or housing 12. The housing 12 is preferably an injection molded plastic component, more preferably made of Valox® 375 (a trademark of General Electric Company) having a bottom wall 14 in which is molded a knockout 16 according to the present invention. In fact, the controller 10 illustrated in FIGS. 1 and 2 has four such knockouts, all being identical and of a standard ¾" diameter. It should be noted that several knockouts of different diameters, preferably of standard dimension such as ½" and 1", etc., could be molded into the housing 12. It should also be noted that while the term "knockout" is used herein to referred to the pre-defined section of the wall that is to be removed to attach electrical conduit to the housing 12, it is in fact designed to be removed without being impacted, as is conventional. Thus, this term is used not as an indication of the technique for removal, but simply to comport with the terminology common in the industry.

Referring now to FIGS. 2–4 and 6, the knockout 16 is formed as a unitary part of the wall 14, preferably during the same injection molding operation in which the wall 14, and possibly the rest of the housing 12, is formed. As best shown in FIGS. 3 and 4, portions of the knockout 16 and most of the wall 14 have an inner face 18 and an outer face 20 defining a wall thickness therebetween. The wall 14 is molded with a break-away section 22 which defines the boundary of the knockout 16 and provides the location at which the knockout 16 separates from the wall 14.

More specifically, the break-away section 22 is largely of a narrowed thickness having one side which is part of the inner face 18 and an opposite side located between the inner 18 and outer 20 faces. This narrowed portion of the break-away section 22 thus forms a generally circular groove 24 in the wall 14 at the periphery of the knockout 16. The break-away section 22 also has two small tabs 26, spaced 180 degrees apart, which are of full thickness (having opposite sides that are part of the Inner 18 and outer 20 faces of the wall) so that the groove 24 is not actually one circular groove, but rather defines two nearly semi-circular sections 24A and 24B of the groove 24. The tabs 26 bolster the connection of the knockout 16 to the wall 14 prior to removal, but are sized of a small enough width that they are readily sheared apart during removal. As shown in FIG. 5, the wall 14, knockout 16 and break-away section 22 all have the inner face 18 in common so that prior to removal there is a continuous, unbroken surface at the inside of the housing 12. The continuous surface prevents the debris and liquid from entering the housing 12 at or around the knockout 16, such that the housing 12 can be made to satisfy the NEMA 4 and NEMA 12 sealing requirements, as known in the art, including sealing sufficient to allow spray down of the housing 12 from a hose.

Referring again to FIGS. 2–4 and 6–7, a tool receptor 30 is molded (as a unitary part) into the knockout 16 (within the boundary defined by the break-away section 22). The tool receptor 30 has four walls, including two long walls 32 and two short walls 34 extending between opposite ends of the long walls 32. The walls 34 define a rectangular pocket 36 sized to receive a readily available tool 28, such as flat-bladed screwdriver or a pliers. The long walls 32 are each braced by three ribs 38 and the short walls 34 are braced by triangular gussets 40 that extend down to the face of the knockout 16 at its periphery near. The bracing Is designed to support the walls of the tool receptor 30 as it is torqued by the tool as well as to rigidify the flat disc portion of the knockout 16 and help transfer the torque load from the tool receptor 30 to the periphery of the knockout 16 and the break-away section 22. Preferably, the gussets 40 extend to the tabs 26 so as to provide added rigidity at these locations to assist in breaking the tabs 26, which are of a thicker diameter than the rest of the break-away section 22. Note that the gussets 40 are preferable, but not required, for the larger diameter knockouts.

The knockout 16 can be removed from the wall 14 of the housing 12 in the conventional manner in which it is struck with a hammer or other impacting implement, however, an important feature of the knockout of the present invention is that it can be removed entirely by rotating it with respect to the housing 12, with no impact action at all. Thus, the knockout 16 is well-suited for devices with electronics that are highly sensitive to shock as well as in devices in which the electronics are mounted very near the knockout 16. Even if the electronics need not be near the knockout, the present invention allows them to be located in close proximity, which could allow for a smaller form factor of the housing or assembly efficiencies not realized with enclosures with conventional knockouts.

Figure 6:
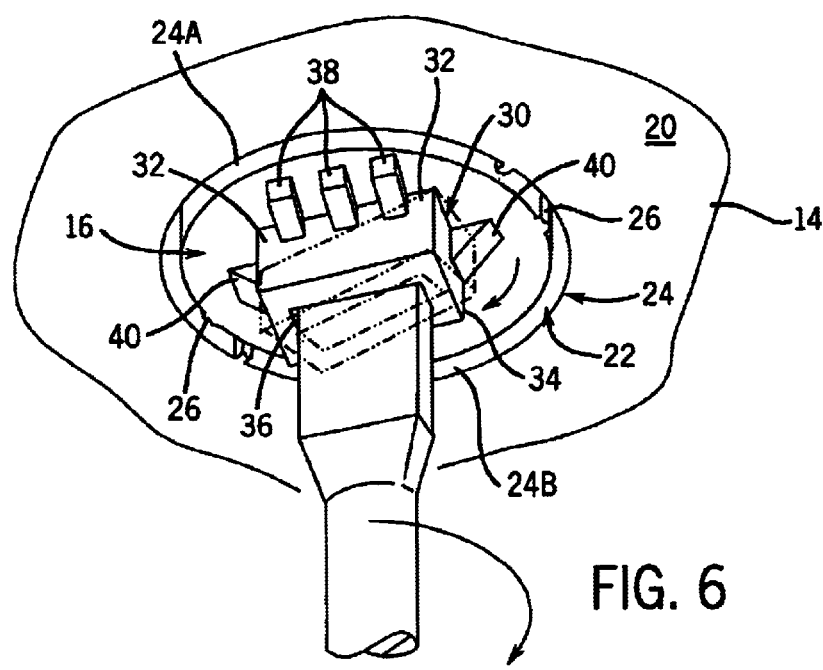
FIG. 6 is a partial perspective view showing a knockout being removed by turning a screwdriver inserted into the tool receptor.
Figure 7:
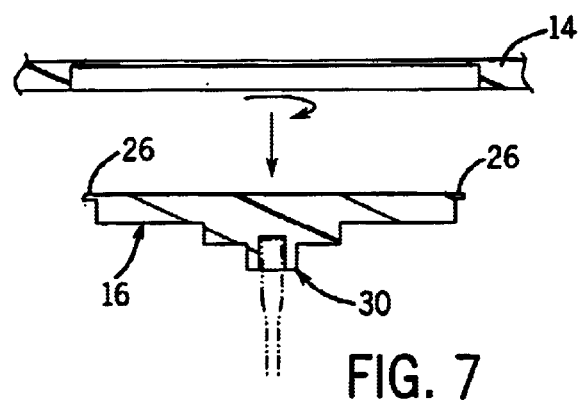
FIG. 7 is a partial cross-sectional view similar to FIG. 4 albeit after the knockout has been removed.
Figure 8:
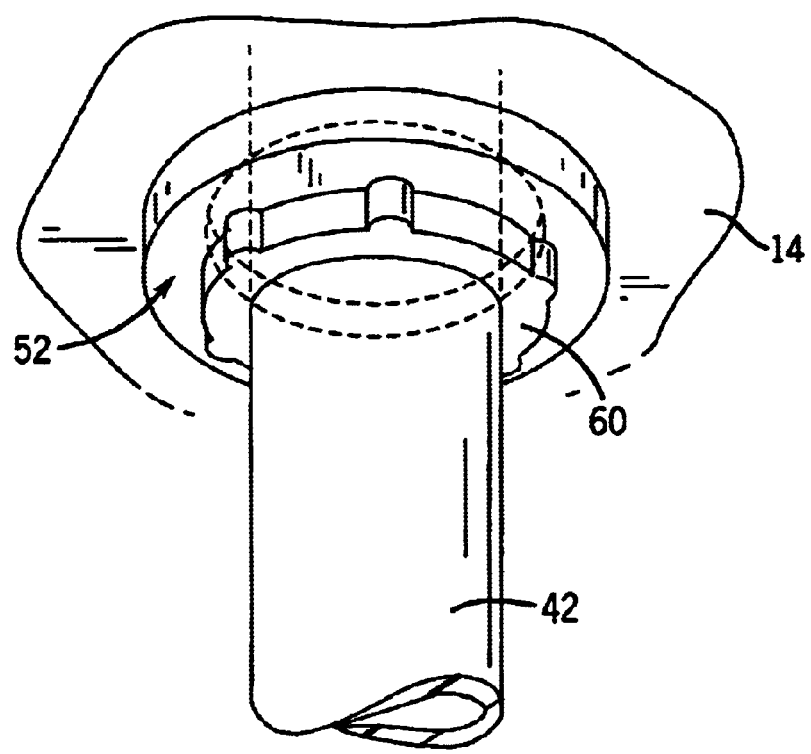
FIG. 8 is a partial perspective view showing an electrical conduit and knockout fitting disposed In an opening in the housing after the knockout has been removed.

FIGS. 6 and 7 illustrate a preferred technique for removing the knockout 16 from the wall 14 of the housing 12. Simply, the tool 28 is attached to the tool receptor 30. This can be as shown in which the blade of the screwdriver is inserted into the pocket 36 or by gripping the exterior of the walls of the tool receptor 30 with a pliers or wrench (not shown). In either case, the tool is used to rotate the knockout with respect to the wall 14, generally in the plane of the wall 14, so as to break loose the material in the break-away section 22 and free the knockout 16 from the housing 12. As shown in FIG. 8, a conduit 42 can be attached to the housing 12 using a conventional knockout fitting 50 having a flanged end (not shown) at the inside of housing 12 that catches against the wall 14 and a threaded tubular end (not shown) on which threads a ring nut 60 to secure the fitting 50 to the housing 12. The conduit 42 can be mounted at a threaded end coupled to the threaded end of the fitting 50 or by any other suitable connection. Preferably for NEMA 4 and NEMA 12 applications, there is a seal around the fitting to seal the opening left after the knockout is removed. Sealing at the opening is improved by the present invention because the break-away section 22 shears off cleaning (even at the tabs 26) and because the knockouts are easily molded to the desired diameter with tighter, tolerances than conventional enclosures with partially punched out knockouts.

A preferred embodiment of the invention has been described above. However, modifications and variations to the preferred embodiment will be apparent to those skilled in the art, which will be within the spirit and scope of the invention. Therefore, the invention should not be limited to just the described embodiment. To ascertain the full scope of the invention, the following claims should be referenced.

What is claimed is:

1. A conduit knockout made from a wall section having a first face and an opposite second face, the wall section defining a break-away section having a first side coplanar with the first face and an opposite second side at least a portion of which is between the first and second faces so as to create a groove in the wall section opening to the second face side of the wall section defining at least a portion of a periphery of the knockout, wherein the wall section defines an essentially continuous, unbroken surface across the break-away section and permits separation of the knockout from the wall section at the break-away section by rotation of the knockout, wherein the wall section includes a tool receptor within the periphery defined by the break-away section adapted to receive a tool for applying torque to break the break-away section and remove the knockout from the wall section.

2. The conduit knockout of claim 1, wherein the break-away section includes a tab portion having opposite sides at the first and second faces of the wall section.

3. The conduit knockout of claim 2, wherein the break-away section includes two tab portions spaced apart 180 degrees and both having opposite sides at the first and second faces of the wall section.

4. The conduit knockout of claim 1, wherein the knockout is generally circular.

5. The conduit knockout of claim 1, wherein the tool receptor is formed as a unitary part of the wall section.

6. The conduit knockout of claim 5, wherein the tool receptor defines a pocket.

7. The conduit knockout of claim 6, wherein the tool receptor has four walls defining the pocket and extending to a third face on the side of the second face opposite the first face.

8. The conduit knockout of claim 7, wherein the tool receptor is braced at one or more sides.

9. The conduit knockout of claim 8, wherein the wall section defines a gusset extending from one of the walls of the tool receptor to the second face of the wall section.

10. The conduit knockout of claim 9, wherein the walls of the tool receptor include two opposite long walls and two short walls extending between the two long walls and wherein the wall section defines two gussets extending from the two short walls to the second face of the wall section.

11. The conduit knockout of claim 10, wherein the gussets extend to the opposite parts of the periphery of the knockout section.

12. The conduit knockout of claim 1, wherein the wall section is part of an electronics housing.

13. The conduit knockout of claim 12, wherein the first face of the wall section is at an interior of the housing.

14. The conduit knockout of claim 1, wherein the wall section is plastic.

15. A twist-out conduit knockout made from a wall section having a first face and an opposite second face, the wall section defining a break-away section having a first side coplanar with the first face and an opposite second side at least a portion of which is between the first and second faces so as to create a groove in the wall section opening to the second face side of the wall section defining at least a portion of a periphery of the knockout, wherein the wall section defines an essentially continuous, unbroken surface across the break-away section, and wherein the wall section defines a pocketed tool receptor within the periphery defined by the break-away section adapted to receive a tool for applying torque to break the break-away section and remove the knockout from the wall section.

16. The knockout of claim 15, wherein the wall section is part of an electronics housing.

17. The knockout of claim 15, wherein the wall section is plastic.

18. A method of forming a conduit knockout in an electronics enclosure, comprising the steps of:

forming a wall of the electronics housing having an inner face and an outer face;

molding into the wall a break-away section at least a portion of which extends from one of the inner and outer faces to an intermediate depth between the inner and outer faces without passing all the way between the inner and outer faces and which defines at least part of a periphery of a conduit knockout; and molding into the conduit knockout a tool receptor adapted to receive a tool for applying torque to break the break-away section and remove the knockout from the wall.

19. A method of removing a conduit knockout from a wall of an electronics housing, comprising the steps of:

attaching a tool to a tool receptor portion of the knockout; and using the tool to rotate the knockout with respect to the wall generally in the plane of the wall so as to separate the knockout from the wall at a break-away section at least a part of which has a narrowed thickness than the wall originally forming a continuous unbroken surface between the wall and the knockout at one side of the housing.

20. A conduit knockout made from a wall section having a first face and an opposite second face, the wall section defining a break-away section having a first side coplanar with the first face and an opposite second side at least a portion of which is between the first and second faces so as to create a groove in the wall section defining at least a portion of a periphery of the knockout, wherein the wall section defines an essentially continuous, unbroken surface across the break-away section and wherein the break-away section includes a tab having sides at the first and second faces and said tab defining at least two sections of the groove separated by the tab, wherein the dimension of the tab defining the distance between the groove sections is small enough to permit shearing of the tab by rotation of the knockout such that the knockout can be separated from the wall section at the break-away section without impacting the knockout.

* * * * *